(12) United States Patent
Han et al.

(10) Patent No.: US 11,951,343 B1
(45) Date of Patent: Apr. 9, 2024

(54) TEMPERATURE-SENSITIVE AUTOMATIC RAPID GAS GENERATION FIRE EXTINGUISHING DEVICE

(71) Applicant: BEIJING INSTITUTE OF TECHNOLOGY, Beijing (CN)

(72) Inventors: Zhiyue Han, Beijing (CN); Cheng Wang, Beijing (CN); Xinrui Zhang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 18/520,483

(22) Filed: Nov. 27, 2023

(30) Foreign Application Priority Data

Nov. 30, 2022 (CN) .......................... 202211525465.X

(51) Int. Cl.
*A62C 35/02* (2006.01)
*A62C 35/10* (2006.01)
(52) U.S. Cl.
CPC ............ *A62C 35/023* (2013.01); *A62C 35/10* (2013.01)
(58) Field of Classification Search
CPC . A62C 99/0027; A62C 99/0045; A62C 13/22; A62C 35/02; A62C 35/023
USPC .......................................................... 169/59
See application file for complete search history.

(56) References Cited

U.S. PATENT DOCUMENTS 11,534,646 B2 * 12/2022 Krishnan ........... A63B 21/0052

FOREIGN PATENT DOCUMENTS

| CN | 106382631 A | 2/2017 | |
|---|---|---|---|
| CN | 208959188 U | 6/2019 | |
| CN | 210044730 U | 2/2020 | |
| CN | 213466609 U | 6/2021 | |
| CN | 113521607 | * 7/2021 | ......... C62C 99/0027 |
| CN | 214130038 U | 9/2021 | |
| CN | 113975683 A | 1/2022 | |
| GB | 629072 A | 9/1949 | |
| JP | 2009160383 A | 7/2009 | |
| RU | 2638238 C1 | 12/2017 | |

(Continued)

OTHER PUBLICATIONS

Liu Huimin et al., "Research and Application Progress of Dry Powder Fire Extinguishing Agents," Journal of Safety and Environment, Dec. 2014, vol. 14, No. 6 (abstract translated).

(Continued)

*Primary Examiner* — Christopher R Dandridge
(74) *Attorney, Agent, or Firm* — Rachel Pilloff; Sean Passino; Pilloff Passino & Cosenza LLP

(57) ABSTRACT

A temperature-sensitive automatic rapid gas generation fire extinguishing device is provided, including a box body; a plurality of heat absorption fire extinguishing units are placed on an inner side wall of the box body, and a first trigger unit is arranged between one of the heat absorption fire extinguishing units close to the first baffle and the inner side wall of the box body; the one of the heat absorption fire extinguishing units triggers the first baffle to move down through the first trigger unit, and a relatively closed space is formed in the box body; a plurality of gas generation fire extinguishing units are placed on an inner side wall of the box body, and a second trigger unit is arranged between one of the gas generation fire extinguishing units close to the second baffle and the inner side wall of the box body.

7 Claims, 4 Drawing Sheets

(56) References Cited

FOREIGN PATENT DOCUMENTS

WO    2017218832  A1    12/2017

OTHER PUBLICATIONS

Notification to Grant Patent for China Application No. 202211525465.X, dated Jun. 20, 2023.
First Search Report for China Application No. 202211525465.X.

* cited by examiner

US 11,951,343 B1

TEMPERATURE-SENSITIVE AUTOMATIC RAPID GAS GENERATION FIRE EXTINGUISHING DEVICE

CROSS-REFERENCE TO RELATED APPLICATIONS

This disclosure claims priority to Chinese Patent Application No. 202211525465.X, filed on Nov. 30, 2022, the contents of which are hereby incorporated by reference.

TECHNICAL FIELD

The disclosure belongs to the technical field of closed box fire extinguishing devices, and in particular to a temperature-sensitive automatic rapid gas generation fire extinguishing device.

BACKGROUND

A box temperature-sensitive automatic fire extinguishing device is a new fire extinguishing device developed to solve problems of complex design, high maintenance cost, high requirements for environments, slow fire extinguishing response and secondary fire reignition of existing fire extinguishing products. Mainly for small spaces such as power distribution cabinets, it is particularly important for intelligent devices that may respond to fire extinguishing in an early stage of fire without damaging original power distribution facilities, lines, components and polluting the surrounding environment, and without a need for induction detectors for electricity, temperature, and smoke, etc. The device may be directly installed in any small space where a fire may occur, and may be arranged in all directions and multiple locations around a fire-prone point, so that a fire source may be detected and extinguished at the first time, and a fixed-point protection effect may be achieved through an accurate design and an accurate arrangement. Therefore, there is an urgent need for a temperature-sensitive automatic rapid gas generation fire extinguishing device that may realize rapid fire extinguishing without a help of inductive devices.

SUMMARY

An objective of the disclosure is to provide a temperature-sensitive automatic rapid gas generation fire extinguishing device to solve the above problems and achieve an objective of automatic rapid fire extinguishing without using electrical devices.

In order to achieve the above objective, the disclosure provides a following scheme: the temperature-sensitive automatic rapid gas generation fire extinguishing device, including a box body, where multiple ventilation holes are formed on opposite side walls of the box body, and a first baffle and a second baffle are vertically and slidably connected to opposite outer side walls of the box body respectively. Multiple heat absorption fire extinguishing units are placed on the inner side wall of the box body, and a first trigger unit is arranged between one of the heat absorption fire extinguishing units close to the first baffle and the inner side wall of the box body. The one of the heat absorption fire extinguishing units triggers the first baffle to move down through the first trigger unit, and a relatively closed space is formed in the box body. Multiple gas generation fire extinguishing units are placed on an inner side wall of the box body, and a second trigger unit is arranged between one of the gas generation fire extinguishing units close to the second baffle and the inner side wall of the box body. The one of the gas generation fire extinguishing units triggers the second baffle to move down through the second trigger unit, and a relatively open space is formed in the box body. The second trigger unit includes a timing part, and the one of the gas generation fire extinguishing units ensures a fire extinguishing state in the box body through the timing part.

Optionally, the one of the heat absorption fire extinguishing units includes a spherical container, one side of the spherical container is provided with multiple through holes, and the multiple through holes are sealed by aluminum foil. A lower part of an inner side of the spherical container is filled with a perfluorohexanone fire extinguishing agent, and multiple blocky fire extinguishing agents are placed on an upper part of the inner side of the spherical container.

Optionally, the gas generation fire extinguishing unit includes multiple blocky fire extinguishing agents, where the fire extinguishing agents include nonmetallic high-nitrogen oxygen-containing organic compounds and binders with a mass ratio of 90-97:3.

Optionally, the first trigger unit includes a fixed ring fixedly connected to the inner side wall of the box body, and a threaded sleeve is sleeved on an inner thread of the fixed ring. An end cover is snap-fit with one end of the threaded sleeve away from the fixed ring, and a relatively closed space is formed in the threaded sleeve, and the spherical container is placed in the threaded sleeve. The multiple through holes are correspondingly arranged on an inner side of the end cover, a first chute is formed on the side wall of the box body, and the first chute is correspondingly arranged with the first baffle. One side of the first baffle close to the box body is fixedly connected with a first connecting rod, and the first connecting rod is adapted to a top of an inner side of the first chute. A metal ball is fixedly connected above one end of the first connecting rod extending into the box body, and a first limiting clamping part is arranged between an upper part of the metal ball and a bottom side of the end cover.

Optionally, the first limiting clamping part includes a first magnetic block fixedly connected below the threaded sleeve, the metal ball is magnetically attracted below the first magnetic block, and a second hinge rod is vertically and fixedly connected above the metal ball. A top end of the second hinge rod is hinged with a first hinge rod, and the top end of the second hinge rod vertically penetrates into a bottom side of the threaded sleeve and is located below the end cover. The first hinge rod is horizontally arranged in a contact manner between a lower side of the end cover and a side wall of the threaded sleeve, and the first hinge rod is located at one side of the second hinge rod close to the box body.

Optionally, the second trigger unit includes a third connecting rod perpendicularly and fixedly connected to a side of the second baffle close to the box body. A second chute is formed on the side wall of the box body and corresponds to the second baffle. The third connecting rod is located at a top of an inner side of the second chute, and a second metal ball is fixedly connected above one end of the third connecting rod extending into the box body. A mesh bearing box is connected to the inner side wall of the box body, and the fire extinguishing agents are placed in the mesh bearing box, and a second limiting clamping part is arranged between the mesh bearing box and the second metal ball.

Optionally, the second limiting clamping part includes a second magnetic block, a second fixed plate and a first fixed plate which are fixedly connected to the inner side wall of the box body from bottom to top in turn. The second metal ball is magnetically attracted below the second magnetic block, a second connecting rod is vertically and fixedly connected above the second magnetic block, a top end of the second connecting rod passes through the second magnetic block, and a first limiting assembly is arranged between the top end of the second connecting rod and the second fixed plate. A timing assembly and a second limiting assembly are arranged between the first limiting assembly and the mesh bearing box, and the second limiting assembly is released by an overall weight change of the mesh bearing box, and the second limiting assembly releases the second baffle through the timing assembly and the first limiting assembly in turn.

Optionally, the first limiting assembly includes a sleeve, and the sleeve is perpendicularly and slidably sleeved on a side at a top of the second connecting rod. A first spring is fixedly connected between the sleeve and the top of the second connecting rod, a fifth connecting rod is perpendicularly and fixedly connected to one side of the sleeve, and a first limit block is fixedly connected to one side of the fifth connecting rod close to the second fixed plate. The first limit block is arranged corresponding to a fourth connecting rod at an edge of the second fixed plate, and one end of the fifth connecting rod away from the sleeve is fixedly connected with a collar. An axis of the collar is arranged parallel to the sleeve, and the collar is axially sleeved on a fixed block at the edge of the second fixed plate, and a top of the collar is arranged corresponding to the timing assembly.

Optionally, the timing assembly includes a fixed column vertically and fixedly connected to a top surface of the second fixed plate, and a first rotating shaft rotatably connected to the top surface of the second fixed plate. The first rotating shaft is arranged in parallel with an axis of the fixed column, an inner end of a coil spring is fixedly connected to a side wall of the first rotating shaft, and an outer end of the coil spring is fixedly connected to the fixed column. A top end of the first rotating shaft penetrates into the first fixed plate and is coaxially and fixedly connected with a gear, and the gear is positioned below the first fixed plate. A clamping block is hinged on a bottom surface of the first fixed plate, one end of the clamping block is provided with a groove, and the groove is matched with teeth of the gear. A second spring is fixedly connected between a perpendicular direction of an other end of the clamping block and the first fixed plate. One side of the clamping block away from the second spring abuts against an eccentric wheel, and the eccentric wheel is rotatably connected to the bottom surface of the first fixed plate through a second rotating shaft, and the second rotating shaft located on a top surface of the first fixed plate is arranged corresponding to the second limiting assembly.

Optionally, the second limiting assembly includes a fixed housing fixedly connected to the top surface of the first fixed plate, and a rack is slidably connected in the fixed housing. A third spring is fixedly connected between one end of the rack and an inner side wall of the fixed housing, a side surface of an other end of the rack is meshed with the second rotating shaft, and a ball is slidably connected in the side wall of the fixed housing in a vertical direction. One side of a convex surface of the ball passes through the fixed housing and fits into a pit on a side wall of the rack, and an other side of the convex surface of the ball is provided with a second limit block in contact, and the second limit block is vertically and slidably connected in the first fixed plate. A top of the second limit block is hinged with a third hinge rod, and the third hinge rod obliquely abuts against a bottom of the mesh bearing box, and a fourth spring is abutted between the mesh bearing box and the first fixed plate.

The disclosure has following technical effects. A main function of the one of the heat absorption fire extinguishing units is to release the first trigger unit to move down the first baffle after absorbing heat released by a fire, so as to form a relatively sealed state in the box body, which is beneficial to isolating outside air and effectively avoiding an expansion of the fire. A main function of the one of the gas generation fire extinguishing units is to release the second trigger unit to move down the second baffle after absorbing the heat released by the fire, so that a relatively open space is formed in the box body, which is convenient for releasing fire extinguishing gas when fire extinguishing is completed, and is helpful for quickly opening the box body and maintaining an inside. On the whole, the disclosure may absorb heat released by a flame and generate fire extinguishing gas according to the heat of the flame without a help of inductive devices in a fire extinguishing process, and achieve an objective of rapid fire extinguishing under a joint action of absorbed heat and the fire extinguishing gas.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labor belong to a scope of protection of the disclosure.

In order to make above objects, features and advantages of the disclosure more obvious and easier to understand, the disclosure may be further described in detail with the attached drawings and specific embodiments.

Figure 1:
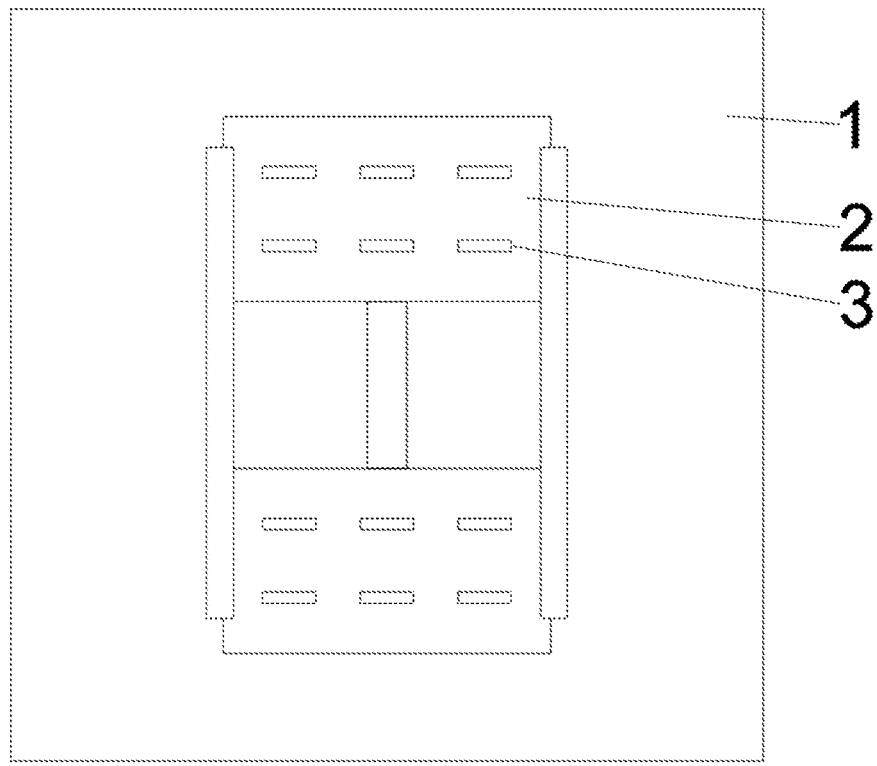
FIG. 1 is a schematic view of a left side of a box body according to the disclosure.
Figure 2:
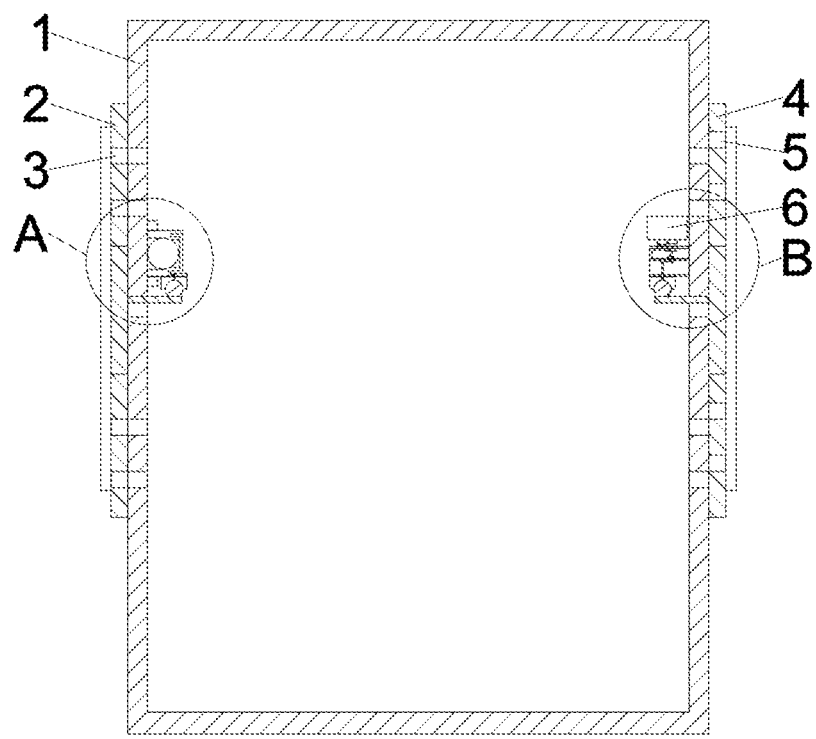
FIG. 2 is a schematic diagram of a front view direction inside a box body according to the disclosure.
Figure 3:
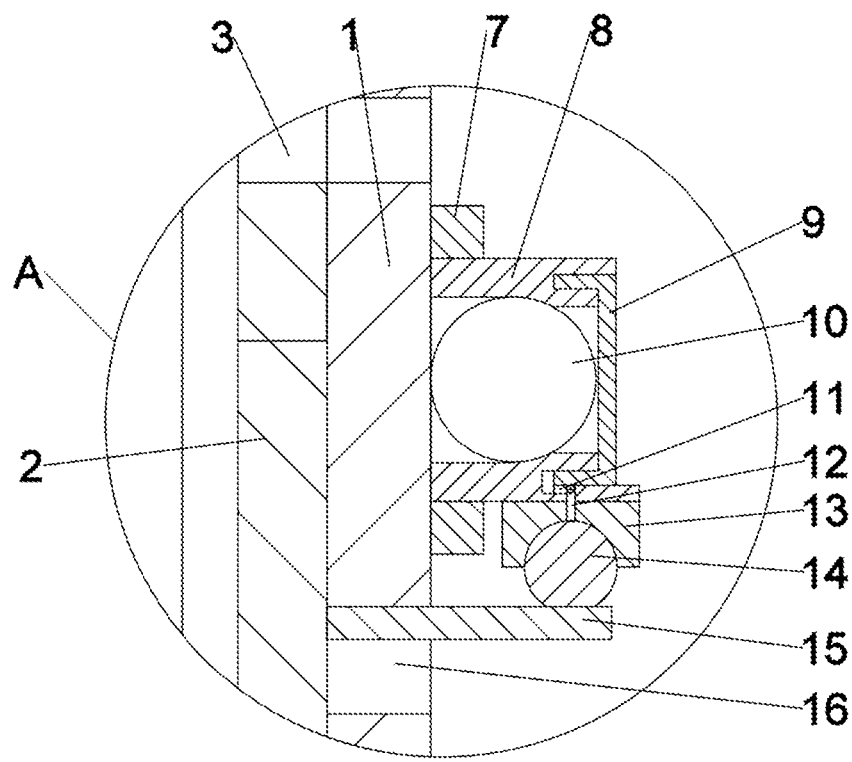
FIG. 3 is a partially enlarged schematic view of A in FIG. 2.
Figure 4:
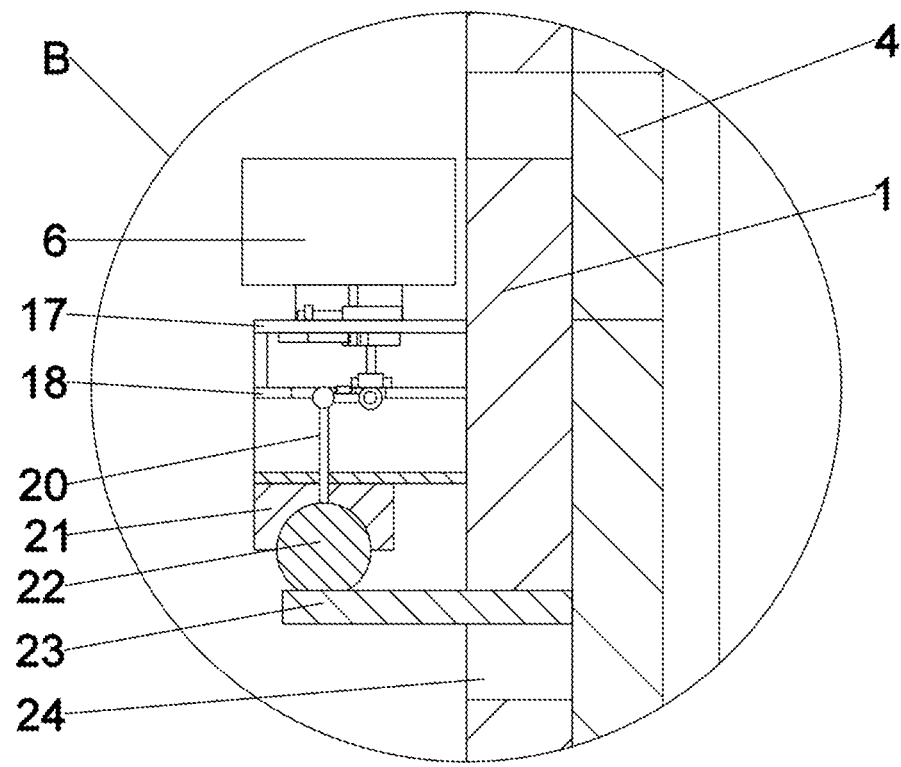
FIG. 4 is a partially enlarged schematic view of B in FIG. 2.
Figure 5:
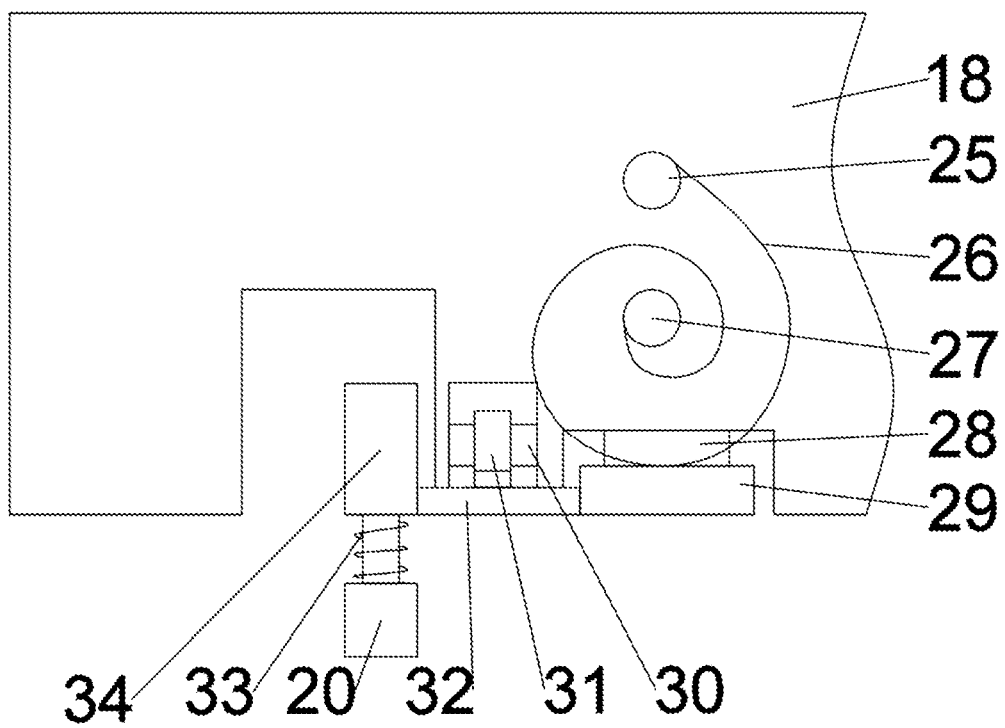
FIG. 5 is a schematic diagram of a corresponding relationship between a coil spring and a collar according to the disclosure.
Figure 6:
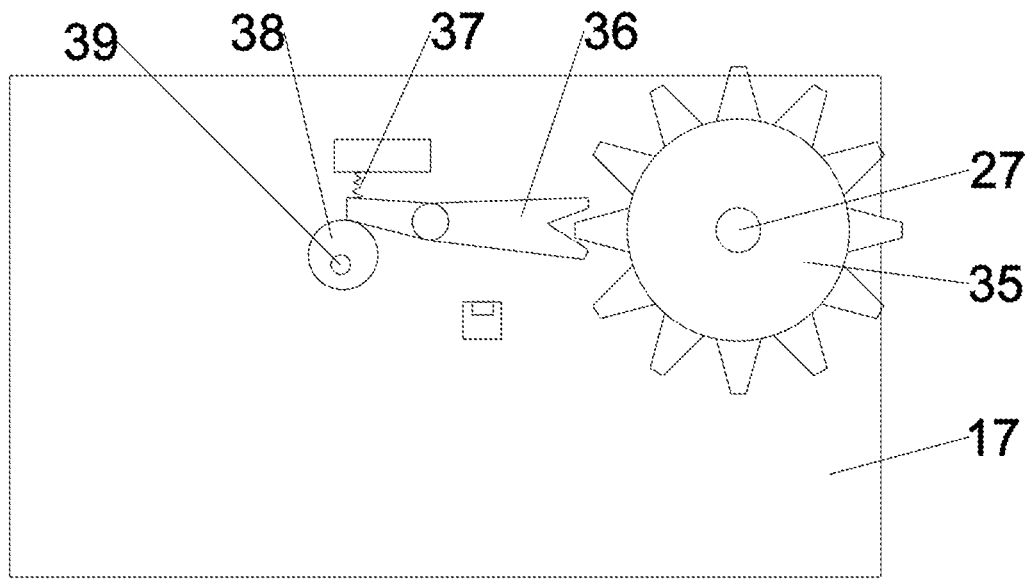
FIG. 6 is a schematic diagram of a gear limit according to the disclosure.
Figure 7:
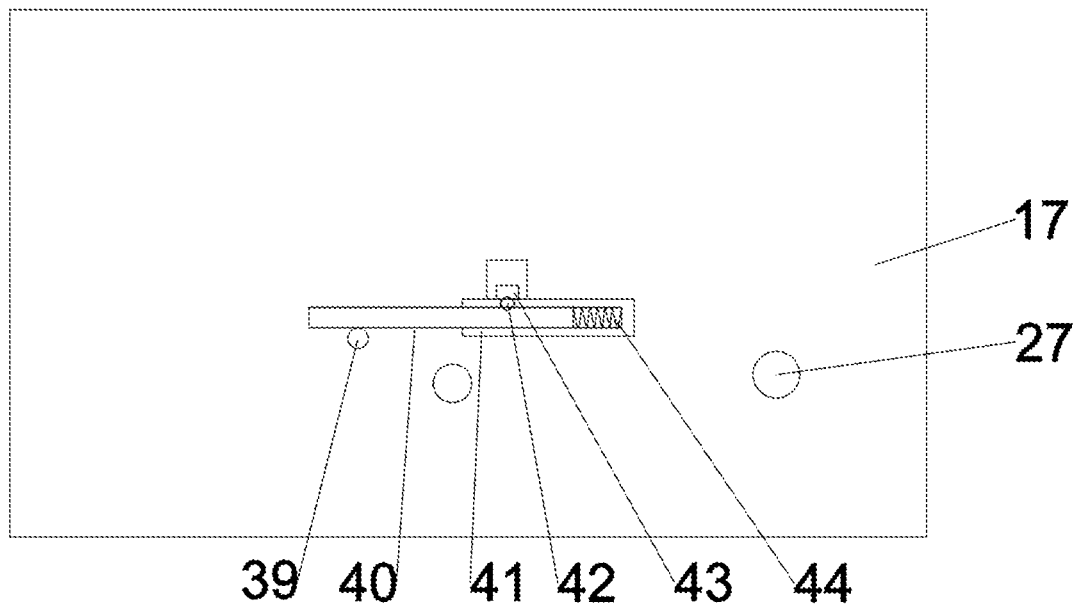
FIG. 7 is a schematic diagram of a top surface of a first fixed plate according to the disclosure.
Figure 8:
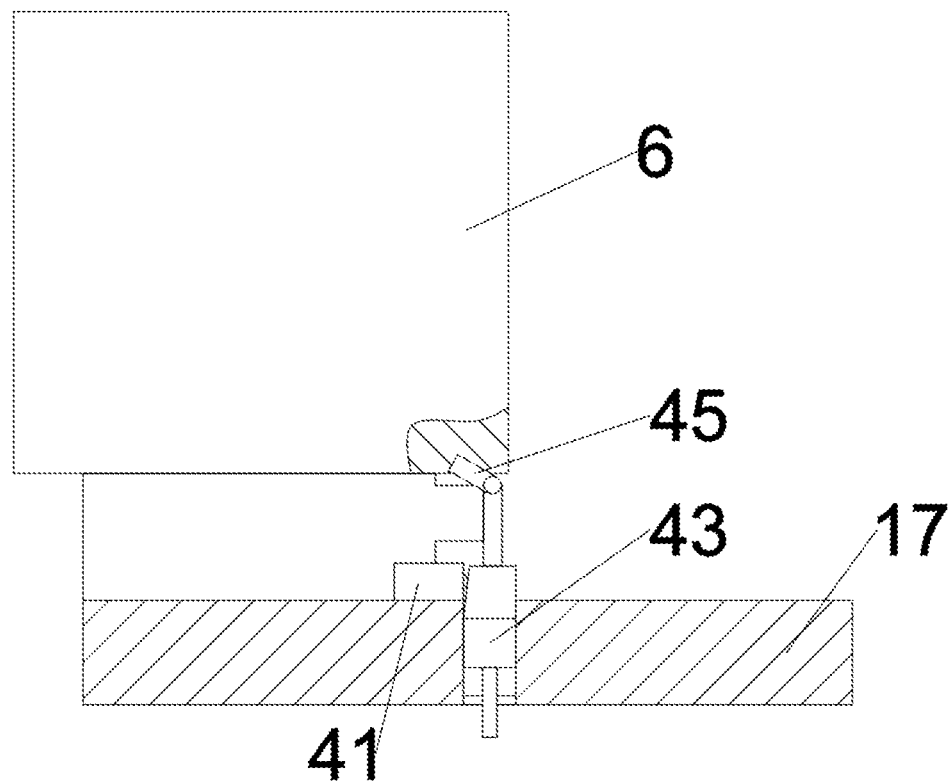
FIG. 8 is a schematic diagram of a limit relationship between a mesh bearing box and a third hinge rod according to the disclosure.

With reference to FIGS. 1-8, the present disclosure provides a temperature-sensitive automatic rapid gas generation fire extinguishing device, including a box body 1, multiple ventilation holes are formed on opposite side walls of the box body 1, and a first baffle 2 and a second baffle 4 are vertically and slidably connected to opposite outer side walls of the box body 1 respectively. Multiple heat absorption fire extinguishing units are placed on an inner side wall of the box body 1, and a first trigger unit is arranged between one of the heat absorption fire extinguishing units close to the first baffle 2 and the inner side wall of the box body 1. The one of the heat absorption fire extinguishing units triggers the first baffle 2 to move down through the first trigger unit, and a relatively closed space is formed in the box body 1. Multiple gas generation fire extinguishing units are placed on an inner side wall of the box body 1, and a second trigger unit is arranged between one of the gas generation fire extinguishing units close to the second baffle 4 and the inner side wall of the box body 1. The one of the gas generation fire extinguishing units triggers the second baffle 4 to move down through the second trigger unit, and a relatively open space is formed in the box body 1. The second trigger unit includes a timing part, and the one of the gas generation fire extinguishing units ensures a fire extinguishing state in the box body 1 through the timing part.

A main function of the one of the heat absorption fire extinguishing units is to release the first trigger unit to move down the first baffle 2 after absorbing heat released by a fire, so as to form a relatively sealed state in the box body 1, which is beneficial to isolating outside air and effectively avoiding an expansion of the fire. A main function of the one of the gas generation fire extinguishing units is to release the second trigger unit to move down the second baffle 4 after absorbing the heat released by the fire, so that a relatively open space is formed in the box body 1, which is convenient for releasing fire extinguishing gas when fire extinguishing is completed, and is helpful for quickly opening the box body 1 and maintaining an inside. On the whole, the disclosure may absorb heat released by a flame and generate fire extinguishing gas according to the heat of the flame without a help of inductive devices in a fire extinguishing process, and achieve an objective of rapid fire extinguishing under a joint action of absorbed heat and the fire extinguishing gas.

In an embodiment, the one of the heat absorption fire extinguishing units includes a spherical container 10, one side of the spherical container 10 is provided with multiple through holes, and the multiple through holes are sealed by aluminum foil, and at least nine groups of through holes are arranged. A lower part of an inner side of the spherical container 10 is filled with a perfluorohexanone fire extinguishing agent, and multiple blocky fire extinguishing agents are placed on an upper part of the inner side of the spherical container 10. The perfluorohexanone fire extinguishing agent is sealed and stored by a plastic film, so as to be separated from the fire extinguishing agents.

When a fire breaks out in the box body 1, a lot of heat is generated, so that the perfluorohexanone fire extinguishing agent volatilizes. It is found through experiments that volatilized gas is limited, and a pressure generated in the spherical container 10 is not enough to break the aluminum foil. Then, when the fire extinguishing agent spontaneously ignites according to the heat of the fire, a large amount of fire extinguishing gas is released and breaks through the aluminum foil under a joint action with perfluorohexanone gas, thus triggering the first trigger unit. Sprayed mixed gas plays a role of fire extinguishing. Strength of the plastic film does not affect an eruption process of fire extinguishing gas and perfluorohexanone gas.

In an embodiment, the gas generation fire extinguishing unit includes multiple blocky fire extinguishing agents, where the fire extinguishing agents include nonmetallic high-nitrogen oxygen-containing organic compounds and binders with a mass ratio of 90-97:3, and the binder is one or more of fluororubber, rosin and phenolic resin.

In an embodiment, the first trigger unit includes a fixed ring 7 fixedly connected to the inner side wall of the box body 1, and a threaded sleeve 8 is sleeved on an inner thread of the fixed ring 7. An end cover 9 is snap-fit with one end of the threaded sleeve 8 away from the fixed ring 7, and a relatively closed space is formed in the threaded sleeve 8, and the spherical container 10 is placed in the threaded sleeve 8. The multiple through holes are correspondingly arranged on an inner side of the end cover 9, a first chute 16 is formed on the side wall of the box body 1, and the first chute 16 is correspondingly arranged with the first baffle 2. One side of the first baffle 2 close to the box body 1 is fixedly connected with a first connecting rod 15, and the first connecting rod 15 is adapted to a top of an inner side of the first chute 16. A metal ball 14 is fixedly connected above one end of the first connecting rod 15 extending into the box body 1, and a first limiting clamping part is arranged between an upper part of the metal ball 14 and a bottom side of the end cover 9.

When a fire breaks out in the box body 1, a lot of heat is generated, a temperature in the box body 1 rises rapidly, a large amount of fire extinguishing gas is generated in the spherical container 10, a pressure in the spherical container 10 rises, and the end cover 9 is immediately impacted after the aluminum foil is broken through. After the end cover 9 is separated from the threaded sleeve 8, the first limiting clamping part is released, and the first baffle 2 moves down, so that the first air holes 3 on the first baffle 2 are no longer communicated with the ventilation holes on the box body 1, and the relatively closed space is formed in the box body 1.

In an embodiment, the first limiting clamping part includes a first magnetic block 13 fixedly connected below the threaded sleeve 8, the metal ball 14 is magnetically attracted below the first magnetic block 13, and a second hinge rod 12 is vertically and fixedly connected above the metal ball 14. A top end of the second hinge rod 12 is hinged with a first hinge rod 11, and the top end of the second hinge rod 12 vertically penetrates into a bottom side of the threaded sleeve 8 and is located below the end cover 9. The first hinge rod 11 is horizontally arranged in a contact manner between a lower side of the end cover 9 and a side wall of the threaded sleeve 8, and the first hinge rod 11 is located at one side of the second hinge rod 12 close to the box body 1.

A magnetic force between the metal ball 14 and the first magnetic block 13 is not greater than gravity of the first baffle 2 and the metal ball 14 as a whole. When the end cover 9 is separated from the threaded sleeve 8, the first baffle 2 and the metal ball 14 move down under an action of overall gravity, and the first hinge rod 11 changes from a horizontal state to a vertical state, and then is separated from the threaded sleeve 8 together with the second hinge rod 12. When maintenance in the box body 1 is completed, a new spherical container 10 is placed in the threaded sleeve 8, and the first baffle 2 is moved up, so that the first hinge rod 11 is located in the threaded sleeve 8 again. At this time, after the end cover 9 is reset, the first hinge rod 11 becomes horizontal and the first baffle 2 is reset.

In an embodiment, the second trigger unit includes a third connecting rod 23 perpendicularly and fixedly connected to a side of the second baffle 4 close to the box body 1. A second chute 24 is arranged on the side wall of the box body 1 and corresponds to the second baffle 4. The third connecting rod 23 is located at a top of an inner side of the second chute 24, and a second metal ball 22 is fixedly connected above one end of the third connecting rod 23 extending into the box body 1. A mesh bearing box 6 is connected to the inner side wall of the box body 1, and the fire extinguishing agents are placed in the mesh bearing box 6, and a second limiting clamping part is arranged between the mesh bearing box 6 and the second metal ball 22.

When the fire breaks out in the box body 1, a lot of heat is generated, and the temperature in the box body 1 rises rapidly, and the fire extinguishing agents begin to spontaneously ignite and release a large amount of fire extinguishing gas. As the fire extinguishing agents continue to burn, an overall weight of the mesh bearing box 6 gradually decreases until the second limiting clamping part is triggered, and then the relatively open state is formed in the box body 1, which is convenient for releasing used fire extinguishing gas.

In an embodiment, the second limiting clamping part includes a second magnetic block 21, a second fixed plate 18 and a first fixed plate 17 which are fixedly connected to the inner side wall of the box body 1 from bottom to top in turn. The second metal ball 22 is magnetically attracted below the second magnetic block 21, a second connecting rod 20 is vertically and fixedly connected above the second magnetic block 21, a top end of the second connecting rod 20 passes through the second magnetic block 21, and a first limiting assembly is arranged between the top end of the second connecting rod 20 and the second fixed plate 18. A timing assembly and a second limiting assembly are arranged between the first limiting assembly and the mesh bearing box 6, and the second limiting assembly is released by an overall weight change of the mesh bearing box 6, and the second limiting assembly releases the second baffle 4 through the timing assembly and the first limiting assembly in turn.

With gradual consumption of the fire extinguishing agents, a weight of the mesh bearing box 6 is reduced, and the second limiting assembly, the timing assembly, the first limiting assembly and the second baffle 4 are released in turn. After the timing assembly is released, triggering of the first limiting assembly will be delayed, and then the release of the second baffle 4 will be delayed. During this delay period, an interior of the box body 1 is relatively closed, and the fire may be quickly prevented from developing. After the fire extinguishing gas lasts for a period of time, the first limiting assembly and the second baffle 4 will be triggered immediately, so that the used fire extinguishing gas is released.

In an embodiment, the first limiting assembly includes a sleeve 34, and the sleeve 34 is perpendicularly and slidably sleeved on a side at a top of the second connecting rod 20. A first spring 33 is fixedly connected between the sleeve 34 and the top of the second connecting rod 20, a fifth connecting rod 32 is perpendicularly and fixedly connected to one side of the sleeve 34, and a first limit block 31 is fixedly connected to one side of the fifth connecting rod 32 close to the second fixed plate 18. The first limit block 31 is arranged corresponding to a fourth connecting rod 30 at an edge of the second fixed plate 18, and one end of the fifth connecting rod 32 away from the sleeve 34 is fixedly connected with a collar 29. An axis of the collar 29 is arranged parallel to the sleeve 34, and the collar 29 is axially sleeved on a fixed block 28 at the edge of the second fixed plate 18, and a top of the collar 29 is arranged corresponding to the timing assembly.

Initially, the first spring 33 is in a free state. When the timing assembly is released, the collar 29 is triggered to move and compress the first spring 33. When the collar 29 is separated from the fixed block 28, the second metal ball 22 and the second baffle 4 move down under the action of gravity, so that multiple second air holes 5 on the second baffle 4 communicate with the multiple ventilation holes, which is convenient for releasing the fire extinguishing gas.

In an embodiment, the timing assembly includes a fixed column 25 vertically and fixedly connected to a top surface of the second fixed plate 18, and a first rotating shaft 27 rotatably connected to the top surface of the second fixed plate 18. The first rotating shaft 27 is arranged in parallel with an axis of the fixed column 25, an inner end of a coil spring 26 is fixedly connected to a side wall of the first rotating shaft 27, and an outer end of the coil spring 26 is fixedly connected to the fixed column 25. A top end of the first rotating shaft 27 penetrates into the first fixed plate 17 and is coaxially and fixedly connected with a gear 35, and the gear 25 is positioned below the first fixed plate 17. A clamping block 36 is hinged on a bottom surface of the first fixed plate 17, one end of the clamping block 36 is provided with a groove, and the groove is matched with teeth of the gear 35. A second spring 37 is fixedly connected between a perpendicular direction of an other end of the clamping block 36 and the first fixed plate 17. One side of the clamping block 36 away from the second spring 37 abuts against an eccentric wheel 38, and the eccentric wheel 38 is rotatably connected to the bottom surface of the first fixed plate 17 through a second rotating shaft 39, and the second rotating shaft 39 located on a top surface of the first fixed plate 17 is arranged corresponding to the second limiting assembly.

The eccentric wheel 38 is coaxially and fixedly connected with the second rotating shaft 39. When the second limiting assembly is released, it drives the second rotating shaft 39 to drive the eccentric wheel 38 to rotate, and then push the clamping block 36 to overcome the second spring 37 and rotate for a certain angle. Whenever a distance between the eccentric wheel 38 and the clamping block 36 is the farthest, the clamping block 36 releases a tooth of the gear 35 and is clamped into the groove under resilience of the coil spring 26. When the distance between the eccentric wheel 38 and the clamping block 36 is the shortest, the groove releases the tooth. At this time, the clamping block 36 blocks a next tooth of the gear 35, and a purpose of delay is achieved through the above processes for many times. While the gear 35 rotates, the coil spring 26 is gradually released, and an outer diameter gradually increases, pushing the collar 29 to move towards the second connecting rod 20. When the second connecting rod 20 moves up, that is, it needs to be restored to its initial state, the first limit block 31 first contacts the fourth connecting rod 30, and then under an extrusion of the fourth connecting rod 30, the first limit block 31 moves in a direction of the second connecting rod 20, and the first spring 33 is compressed. When the first limit block 31 moves above the fourth connecting rod 30, the first spring 33 is released, pushing the collar 29 to be sleeved on the fixed block 28. At this time, the second baffle 4 is limited.

In an embodiment, the second limiting assembly includes a fixed housing 41 fixedly connected to the top surface of the first fixed plate 17, and a rack 40 is slidably connected in the fixed housing 41. A third spring 44 is fixedly connected between one end of the rack 40 and an inner side wall of the fixed housing 41, a side surface of an other end of the rack 40 is meshed with the second rotating shaft 39, and a ball 42 is slidably connected in the side wall of the fixed housing 41 in a vertical direction. One side of a convex surface of the ball 42 passes through the fixed housing 41 and fits into a pit on a side wall of the rack 40, and an other side of the convex surface of the ball 42 is provided with a second limit block 43 in contact, and the second limit block 43 is vertically and slidably connected in the first fixed plate 17. A top of the second limit block 43 is hinged with a third hinge rod 45, and the third hinge rod 45 obliquely abuts against a bottom of the mesh bearing box 6, and a fourth spring (not shown in the figure) is abutted between the mesh bearing box 6 and the first fixed plate 17.

With the continuous combustion of the fire extinguishing agents, the overall weight of the mesh bearing box 6 is decreasing, resilience of the fourth spring is greater than gravity of the mesh bearing box 6, and the mesh bearing box 6 is lifted, thereby releasing the third hinge rod 45, making the second limit block 43 move down. The ball 42 disengages from the pit, drives the rack 40 to extend under an action of the resilience of the third spring 44, and engages and drives the second rotating shaft 39 to rotate, thereby starting the timing assembly, so as to release the second baffle 4 in turn and make the box body 1 communicate with an outside.

In an embodiment, the fire extinguishing agents are mainly nonmetallic high-nitrogen oxygen-containing organic compounds and a small amount of binder. Because the fire extinguishing agents have a high oxygen content, a good oxygen balance and a high gas production efficiency, and gas produced is mostly nitrogen and a small amount of carbon dioxide, and contents of nitrogen oxides and carbon monoxide are extremely low, so the gas produced by combustion is clean. The disclosure has no pollution to environments as a whole and is not limited by complicated and narrow spaces, and may keep a standby mode for several years, and customize different fire extinguishing modules according to specific fire prevention and extinguishing spaces.

In an embodiment, the nonmetallic high-nitrogen oxygen-containing organic compounds are sieved to obtain evenly mixed powder, the binder is dissolved in an organic solvent, and is added into the powder for granulation, and solid particles are obtained after drying. The obtained solid particles are pressed into tablets to obtain the fire extinguishing agents.

After a fire breaks out, as the fire spreads, a relatively high temperature is generated in a relatively closed space. When the temperature reaches 120-170° C., the fire extinguishing agents undergo a rapid chemical reaction, instantly producing high-pressure inert gas with a certain temperature. Under excitation of a high temperature and a high pressure, the perfluorohexanone fire extinguishing agent is sprayed into the air. The perfluorohexaenone fire extinguishing agent quickly vaporizes and diffuses, and has a synergistic effect with the inert gas generated by the fire extinguishing agents, so that the fire is extinguished in a fully submerged physical cooling manner, with a high fire extinguishing efficiency.

The perfluorohexanone fire extinguishing agent has a good fire extinguishing effect, and its mechanism is to extinguish the fire through physical and chemical effects and is divided into three processes.

Firstly, cooling down and extinguishing fire: after high-speed atomization and spraying, a perfluorohexanone liquid vaporizes when heated. Due to a large gasification heat capacity and a strong heat absorption ability, a flame quickly loses heat, disrupting tetrahedral balance of the fire.

Secondly, asphyxiation and fire extinguishing: a proportion of perfluorohexanone is large, and oxygen in the air may be isolated around the flame in a process of suspension and falling.

Thirdly, fire extinguishing with chemical suppression: free radicals of the combustion chain reaction may be captured and a chain reaction of flame propagation is terminated.

The disclosure also has following advantages.

Firstly, the fire extinguishing agents and perfluorohexanone do not contain any metal ions and have good insulation.

Secondly, the fire extinguishing agents and perfluorohexanone are automatically triggered by temperature sensing in a fire field, and no additional detection unit is needed, so that a fire extinguishing efficiency is high and a production cost is low.

Thirdly, clean inert gas is generated after the fire extinguishing agents are triggered, which will not cause secondary pollution and is environment-friendly.

Fourthly, the fire extinguishing agents do not need to be stored in a pressure vessel, so there is no risk of leakage and explosion, making the agents safer.

In a description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in accompanying drawings, solely for a convenience of describing the disclosure, rather than indicating or implying that a device or a assembly referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by ordinary technicians in the field to the technical scheme of the disclosure shall fall within the scope of protection determined by claims of the disclosure.

What is claimed is:

1. A temperature-sensitive automatic rapid gas generation fire extinguishing device, comprising a box body, wherein a plurality of ventilation holes are formed on opposite side walls of the box body, and a first baffle and a second baffle are vertically and slidably connected to opposite outer side walls of the box body respectively; a plurality of heat absorption fire extinguishing units are placed on an inner side wall of the box body, and a first trigger unit is arranged between one of the heat absorption fire extinguishing units close to the first baffle and the inner side wall of the box body; the one of the heat absorption fire extinguishing units triggers the first baffle to move down through the first trigger unit, and a relatively closed space is formed in the box body; a plurality of gas generation fire extinguishing units are placed on the inner side wall of the box body, and a second trigger unit is arranged between one of the gas generation fire extinguishing units close to the second baffle and the inner side wall of the box body; the one of the gas generation fire extinguishing units triggers the second baffle to move down through the second trigger unit, and a relatively open space is formed in the box body; the second trigger unit comprises a timing part, and the one of the gas generation fire extinguishing units ensures a fire extinguishing state in the box body through the timing part;

the one of the heat absorption fire extinguishing units comprises a spherical container, one side of the spherical container is provided with a plurality of through holes, and the plurality of through holes are respectively sealed by aluminum foil; a lower part of an inner side of the spherical container is filled with a perfluorohexanone fire extinguishing agent, and a plurality of blocky fire extinguishing agents are placed on an upper part of the inner side of the spherical container;

the first trigger unit comprises a fixed ring fixedly connected to the inner side wall of the box body, and a threaded sleeve is sleeved on an inner thread of the fixed ring; an end cover is snap-fit with one end, away from the fixed ring, of the threaded sleeve, and a relatively closed space is formed in the threaded sleeve; and the spherical container is placed in the threaded sleeve; the plurality of through holes are correspondingly arranged on an inner side of the end cover, a first chute is formed on one of the side walls of the box body, and the first chute is correspondingly arranged with the first baffle; one side, close to the box body, of the first baffle is fixedly connected with a first connecting rod, and the first connecting rod is adapted to a top of an inner side of the first chute; and a metal ball is fixedly connected above one end, extending into the box body, of the first connecting rod, and a first limiting clamping part is arranged between an upper part of the metal ball and a bottom side of the end cover;

when a fire breaks out in the box body, a lot of heat is generated, a temperature in the box body rises rapidly, a large amount of fire extinguishing gas is generated in the spherical container, a pressure in the spherical container rises, and the end cover is immediately impacted after the aluminum foil is broken through; after the end cover is separated from the threaded sleeve, the first limiting clamping part is released, and the first baffle moves down, first air holes on the first baffle are no longer communicated with the ventilation holes on the box body, and the relatively closed space is formed in the box body;

the second trigger unit comprises a third connecting rod perpendicularly and fixedly connected to a side, close to the box body, of the second baffle; a second chute is formed on the side wall of the box body and correspondingly arranged with the second baffle; the third connecting rod is located at a top of an inner side of the second chute, and a second metal ball is fixedly connected above one end, extending into the box body, of the third connecting rod; a mesh bearing box is connected to the inner side wall of the box body, and fire extinguishing agents are placed in the mesh bearing box, and a second limiting clamping part is arranged between the mesh bearing box and the second metal ball;

when the fire breaks out in the box body, a lot of heat is generated, and the temperature in the box body rises rapidly, and the fire extinguishing agents begin to spontaneously ignite and release a large amount of fire extinguishing gas; as the fire extinguishing agents continue to burn, an overall weight of the mesh bearing box gradually decreases until the second limiting clamping part is triggered, and then a relatively open state is formed in the box body, facilitating a release of used fire extinguishing gas.

2. The temperature-sensitive automatic rapid gas generation fire extinguishing device according to claim 1, wherein the one of the gas generation fire extinguishing units comprises a plurality of blocky fire extinguishing agents, and the fire extinguishing agents comprise nonmetallic high-nitrogen oxygen-containing organic compounds and binders with a mass ratio of 90-97:3.

3. The temperature-sensitive automatic rapid gas generation fire extinguishing device according to claim 2, wherein the first limiting clamping part comprises a first magnetic block fixedly connected below the threaded sleeve, the metal ball is magnetically attracted below the first magnetic block, and a second hinge rod is vertically and fixedly connected above the metal ball; a top end of the second hinge rod is hinged with a first hinge rod, and the top end of the second hinge rod vertically penetrates into a bottom side of the threaded sleeve and is located below the end cover; the first hinge rod is arranged between a lower side of the end cover and a side wall of the threaded sleeve in horizontal contact; and the first hinge rod is located at one side, close to the box body, of the second hinge rod.

4. The temperature-sensitive automatic rapid gas generation fire extinguishing device according to claim 3, wherein the second limiting clamping part comprises a second magnetic block, a second fixed plate and a first fixed plate fixedly connected to the inner side wall of the box body from bottom to top in turn; the second metal ball is magnetically attracted below the second magnetic block, a second connecting rod is vertically and fixedly connected above the second magnetic block, a top end of the second connecting rod passes through the second magnetic block, and a first limiting assembly is arranged between the top end of the second connecting rod and the second fixed plate; a timing assembly and a second limiting assembly are arranged between the first limiting assembly and the mesh bearing box, and the second limiting assembly is released by an overall weight change of the mesh bearing box, and the second limiting assembly releases the second baffle through the timing assembly and the first limiting assembly in turn.

5. The temperature-sensitive automatic rapid gas generation fire extinguishing device according to claim 4, wherein the first limiting assembly comprises a sleeve, and the sleeve is perpendicularly and slidably sleeved on a side of a top of the second connecting rod; a first spring is fixedly connected between the sleeve and the top of the second connecting rod, a fifth connecting rod is perpendicularly and fixedly connected to one side of the sleeve, and a first limit block is fixedly connected to one side, close to the second fixed plate, of the fifth connecting rod; the first limit block is correspondingly arranged with a fourth connecting rod at an edge of the second fixed plate, and one end, away from the sleeve, of the fifth connecting rod is fixedly connected with a collar; an axis of the collar is arranged parallel to the sleeve, and the collar is axially sleeved on a fixed block at the edge of the second fixed plate, and a top of the collar is correspondingly arranged with the timing assembly.

6. The temperature-sensitive automatic rapid gas generation fire extinguishing device according to claim 5, wherein the timing assembly comprises a fixed column vertically and fixedly connected to a top surface of the second fixed plate, and a first rotating shaft rotatably connected to the top surface of the second fixed plate; the first rotating shaft is arranged in parallel with an axis of the fixed column, an inner end of a coil spring is fixedly connected to a side wall of the first rotating shaft, and an outer end of the coil spring is fixedly connected to the fixed column; a top end of the first rotating shaft penetrates into the first fixed plate and is coaxially and fixedly connected with a gear, and the gear is positioned below the first fixed plate; a clamping block is hinged on a bottom surface of the first fixed plate, one end of the clamping block is provided with a groove, and the groove is matched with teeth of the gear; a second spring is fixedly connected between a perpendicular direction of an other end of the clamping block and the first fixed plate; one side, away from the second spring, of the clamping block abuts against an eccentric wheel, and the eccentric wheel is rotatably connected to the bottom surface of the first fixed plate through a second rotating shaft, and the second rotating shaft located on a top surface of the first fixed plate is correspondingly arranged with the second limiting assembly.

7. The temperature-sensitive automatic rapid gas generation fire extinguishing device according to claim 6, wherein the second limiting assembly comprises a fixed housing fixedly connected to the top surface of the first fixed plate, and a rack is slidably connected in the fixed housing; a third spring is fixedly connected between one end of the rack and an inner side wall of the fixed housing, a side surface of an other end of the rack is meshed with the second rotating shaft, and a ball is slidably connected in the side wall of the fixed housing in a vertical direction; one side of a convex surface of the ball passes through the fixed housing and fits into a pit on a side wall of the rack, and an other side of the convex surface of the ball is provided with a second limit block in contact, and the second limit block is vertically and slidably connected in the first fixed plate; a top of the second limit block is hinged with a third hinge rod, and the third hinge rod obliquely abuts against a bottom of the mesh bearing box, and a fourth spring is abutted between the mesh bearing box and the first fixed plate.

* * * * *